United States Patent Office 2,695,669
Patented Nov. 30, 1954

2,695,669

CEMENT COMPOSITIONS AND CEMENTING OPERATIONS

Carroll V. Sidwell, Tulsa, Okla.

No Drawing. Application June 16, 1953,
Serial No. 362,166

20 Claims. (Cl. 166—29)

This is a continuation in part of my copending application Serial No. 160,585, filed May 6, 1950, and now abandoned.

This invention relates to cement compositions and cementing operations and more particularly to a readily pumpable cement composition and method of handling cement compositions which is especially useful in cementing oil and gas wells or the like. In drilling oil and gas wells it is frequently necessary to cement the well casing or in cases where circulation of the drilling fluid has been lost and cannot be restored to seal the openings through which the circulation is lost with a cement plug or block. It is desirable that the weight of the cement be kept at a minimum, limited however by the need for maintaining a certain amount of resistance to compression and the need for a very low permeability to fluids contained in the well hole after the cement is set. It is also necessary that the cement be pumpable in order to be introduced into the well hole. Present practice in cementing oil and gas wells is to use a slurry of Portland cement, gypsum cement or other quick-hardening cement in water either alone or admixed with certain bulking agents such as cane fibre, wood fibres, cellophane, cotton seed hulls, etc. Care must be taken however in making additions of bulking agents to cements since their addition in most instances increases the viscosity markedly and in some types of bulking agents the tendency to "bulk-up" in the drill pipe is so great that the amount which may be added is very small. In the case of certain organic bulking agents the products of reaction and decomposition attack the cement causing it to deteriorate after a relatively short period of time. For example, sugar cane fibre may decompose producing products which will attack and cause the cement to deteriorate within a matter of a few months.

The use of cement alone or in combination with many of the aforementioned bulking agents under high pressure frequently results in premature dehydration of the cement and consequent loss of its mobility. This appears to be caused by separation and agglomeration of the cement particles from the slurry by their own weight or by the water filtering away from the cement particles into porous or fractured zones. Cement which has been thus prematurely dehydrated cannot be moved into position around the well casing in casing cement jobs or into the zone of lost circulation where the purpose of the cement is to prevent such losses.

In addition to the difficulties mentioned above, it has been found that the producing zones of certain oil fields are located below or between corrosive brine zones which attack and destroy the well casing, which same brines will attack ordinary oil well cements resulting in their destruction within a short period of time.

In placing ordinary oil well cements it is the general practice to remove the excess wall cake formed by the drilling fluid in the well hole by the use of mechanical scratching devices attached to the casing. This practice is necessary in order to increase the effectiveness of the cement, to reduce channeling and contamination of the cement slurry and to get a satisfactory bond between the cement and the wall of the well hole. The use of such scratchers, however, requires the raising, lowering and in some cases, the rotation of the casing. This practice is hazardous and undesirable since movement of the casing in this fashion frequently results in failure and fracture of the casing, the reopening of a previously sealed porous formation and consequently loss of circulation or causes a large amount of material to break away from the wall of the well bore and choke the bore any of which might make it necessary to abandon the entire operation.

I have found a material and a method for cementing oil and gas wells and the like which have proven to be far superior to any presently known method or material for cementing operations in oil and gas wells or the like. Tests have shown that the cementing material of my invention may have a relatively light weight yet have sufficiently high compressive strength. The material of this invention has been found to resist the corrosive influences of brines which destroy ordinary well cements and casing and itself does not contain materials which will decompose thereby deleteriously affecting the life of the hardened aggregate. This material has been found to have a high insulating factor approaching that of cork which is particularly important in wells that are subject to great temperature change inside the casing due to the cooling effect of expanding gas. It has also been found that the cement of this invention will act as its own scouring agent to remove excess wall cake in the well and thus avoid the extra hazard of moving the well casing and the possibility of opening a porous formation with subsequent loss of circulation. Moreover, the cement composition of my invention resists premature dehydration and loss of mobility.

I have discovered a cement composition for well drilling comprising in general a mixture of cement and expanded volcanic rock, or cement, volcanic rock and bentonite in certain proportions which is relatively light in weight, has sufficiently high compressive strength, will resist deterioration in the well hole, and will give a better bond to the wall of the hole.

I have found that when these materials are admixed in proper proportions with water they will produce a slurry which will be light in weight and can be readily pumped into the well hole. A suitable mixture for most well cementing purposes will have a compressive strength in excess of 1,000 lbs. per square inch and is made up of cement, bentonite and expanded volcanic rock in the broad proportions of between about one part of cement to from about 0.1 to 8 parts of expanded volcanic rock by volume to cement and 0. to 10% by weight of bentonite on the weight of the cement. A cement composition having narrower ranges of compressive strength, mobility and weight can be produced by admixing cement and expanded volcanic rock in the proportions of about 1:0.5 to 1:2 by volume of cement with from 0. to 10% by weight of bentonite on the weight of the cement.

In applications where the thixotropic properties of bentonite are not needed or desired the bentonite may be omitted and the mixture of cement and expanded volcanic rock used alone.

My preferred mixture however, for general use, comprises a mixture of cement and expanded volcanic rock in a ratio of about 1:1 by volume with about 5% by weight of bentonite on the weight of the cement.

In order to produce a slurry which may be pumped into the well hole the above compositions are added to a sufficient amount of water to produce a pumpable mixture. I have found that when any of the aforementioned compositions are added to an amount of water equal to about 40% to 90% by weight of the weight of the cement, a satisfactory and pumpable slurry will be produced. Such a slurry should preferably have a viscosity not exceeding 40 poises, although under some conditions of well bores apparent higher viscosities may be desirable.

The cement used in the practice of my invention is preferably Portland cement, however any of the cements commonly used in oil well cementing operations such as gypsum cement, the quick-hardening cements and plastic cements appear to be satisfactory.

While I may employ in my composition any volcanic rock which may be expanded by heating I prefer to use expanded perlite. Expanded perlite is obtained by expanding the volcanic rock of the same name by the Mulheisen or the rotary tube process. In such processes the expansion takes place upon heating during which time the molecular water is driven off leaving a light weight, uniform-textured inert mineral substance. The expanded material appears to be composed of small cells containing air or gas and is generally accepted as having the composition of amorphous aluminum silicate wherein the radical components vary greatly. The perlites that have proven most satisfactory are those derived from the so-called "tough ores" similar to the John Clare ore of Colorado. The conditions of expansion may be controlled so as to give expanded perlites of controlled size and weight. Although the limiting factor in the use of the varying sizes of perlite appears to be the size of the pump orifices and the crushing strength of the individual perlite particles it has been found that sizes up to and including ¼" are most satisfactory for use in well drilling cements. Larger sizes of perlite may, of course, be used depending upon the condition of the well and the handling equipment. Preferably the perlite should be of a quality which will not compress more than 25% of its bulk volume on applications of fluid column pressures of 10,000 pounds per square inch. The expanded perlite having graded sizes from 200 mesh to ¼" with substantially equal amounts of fine and large particles appears to be most satisfactory when its weight is between about 18 to 20 pounds per cubic foot whereas the perlite having particles predominantly between 30 mesh and 12 mesh are most satisfactory when the weight is maintained between 12 to 15 pounds per cubic foot.

The method of cementing oil wells according to this invention comprises generally the steps of admixing cement and an expanded volcanic rock in a ratio by volume of about 1:0.1 to 1:8 wth about 0. to 10% of bentonite by weight of the cement in an amount of water sufficient to form a pumpable slurry and pumping the resulting admixture into the well hole. The maximum viscosity for pumpability is about 40 poises which may be usually achieved by adding an amount of water equal to about 40% to 90% by weight of the weight of the cement.

The exceptional results which may be had by using the cement composition and method of my invention will be more apparent from the following examples.

EXAMPLE I

*Hobbs Pool, New Mexico.*—Well with 7 inch outside diameter casing set 4,008 feet; total depth of well 4,234 feet. A 5½ inch outside diameter with Simplex shoe was set with top of liner at 3,921 feet. 100 sacks (100 ft.³) of cement were pumped through tubing attached to liner without achieving a shut off. A Baker retrievable retainer was set at 3,810 feet, and 200 sacks (200 ft.³) of cement were pumped into the well on vacuum but failed to cement the liner. 50 sacks (50 ft.³) of cement with 24 ft.³ of expanded perlite (graded sizes 30 mesh to ¼ inch) was then pumped into well and 4,000 lb. squeeze pressure was obtained after all but 1.5 barrels of slurry were out of the tubing. The latter composition was permitted to set and drilled out satisfactorily.

EXAMPLE II

*Reeves County, Texas.*—Cable tool hole with 10¾ inch casing set at 358 feet. The casing was cement with 50 sacks (50 ft.³) of cement but filled up with water when hole was drilled. A second 50 sacks of cement were added with same result. 100 sacks (100 ft.³) of cement with 36 ft.³ of expanded perlite in graded sizes (200 mesh to ¼ inch) was added. Pressure to 1,500 lbs. was achieved when 40 sacks pumped out. Plug was drilled and hole was satisfactory.

EXAMPLE III

*Barnhart Pool, Texas.*—Total well depth 4,880 feet with 7⅝ inch casing set at 4,872 feet. The well was cemented with 450 sacks (450 ft.³) cement and 100 ft.³ of graded sizes of expanded perlite (30 mesh to ¼ inch) followed by 50 sacks of neat cement slurry. Full returns were obtained throughout the entire job which is very unusual for this particular pool. A fill-up of 64% was obtained on the job. The previous five wells had obtained an average fill-up of only 36% as compared with the 64% obtained on this job.

EXAMPLE IV

*Monument Pool, New Mexico.*—This well has 7 inch outside diameter casing set at 3,777 feet and the total depth of hole was 3,883 feet. The top of liner was set on B. O. T. hanger with packer at 3,739 feet and bottom of liner at 3,892 feet. The liner was cemented with 100 sacks (100 ft.³) of cement but without success. The liner was perforated between 3,841 and 3,844 feet and K Model retainer set above top of liner. 150 sacks of cement, with 36 feet³ of expanded perlite (graded sizes between 30 mesh and ¼ inch) in last 25 sacks, was added and squeeze pressure raised to 2,500 lbs. The plug was drilled and well placed on production without further perforation.

The usual cement slurry for well cementing purposes is a 44% slurry made up by adding 5 gallons of water to one sack of cement which contains approximately 1 ft.³ and weighs about 94 lbs. Such a slurry will weigh approximately 15.9 lbs. per gallon. The addition of representative amounts of perlite and bentonite to such a slurry will change the weight as shown in Table I below:

Table I

44% CEMENT SLURRY WEIGHT

| Percent by volume of expanded perlite to volume of cement | With 0% Bentonite | With 3% Bentonite | With 5% Bentonite |
| --- | --- | --- | --- |
| 0 | 15.85 | 15.55 | 15.9 |
| 20 | 14.6 |  | 15.6 |
| 40 | 13.4 | 13.85 | 14.6 |
| 60 | 12.8 | 13.19 | 13.75 |
| 80 | 13.05 | 13.05 | 13.65 |
| 100 | 12.45 | 12.60 | 13.20 |
| 200 | 9.9 | 9.75 |  |

The above weights were made by means of a Baroid mud scale, after mixing for 1 hour.

A slurry containing perlite with or without bentonite added to cement and having a weight of 10 lbs. per gallon will have a reduction in pressure head of 37% over a 44% or 15.8 lb. slurry which means that a column of cement at 10 lbs./gal. can be raised 49.5% higher with the same pressure than can a 15.8 lb./gal. slurry. This reduces the pressure on the formation accordingly and descreases the tendency of the cement to be lost into porous formations for any given height of cement.

Comparative apparent viscosities of cement slurries with ordinary bulking agents and expanded perlite are set out in Table II. These viscosities are in terms of poises after one hour mixing in a 44% slurry:

Table II

APPARENT VISCOSITIES OF CEMENT SLURRIES

|  | Percentage by weight | | | | |
| --- | --- | --- | --- | --- | --- |
|  | 1% | 2% | 3% | 5% | 10%[1] |
| Redwood fibre | 32.5 | 70 |  |  |  |
| Cane fibre | 25 | 40 | 73.5 |  |  |
| Balsawood fibre | 22 | 50 |  |  |  |
| Cellophane | 20.5 | 39 | 53 |  |  |
| Expanded perlite | 11.5 | 15.5 | 19 | 23.5 | 41.5 |

[1] 10% by weight would be approximately 50% by volume.

These comparative viscosities are significant in view of the fact that the limit of pumpability or mobility of cement has been found to be in the neighborhood of 40 poises. Of equal significance is the fact that the pumpability of a slurry containing expanded perlite can be increased by increasing the water cement ratio whereas with the ordinary bulking agents this does not apply.

In addition to the advantages of resistance to corrosive environments, insulating value, reduction in weight and viscosity, etc., already pointed out, the cement composition of my invention is particularly suitable for certain specialized cementing operations. For example, the composition of this invention produces a material when set which is much less brittle than cements formed by water and cement alone, and is particularly suited for gun perforating to complete a well. When this material is perforated as is the usual practice in oil well completion it is less liable to shatter and fracture than ordinary cements. In so-called "squeeze" cementing jobs the usual practice requires building up pressures with fluid high enough to break down the formation (fractures, etc.) to give room for the cement to be placed and then pumping the cement into the well, however, in many cases build up pressures cannot be obtained because of loss of cement into openings made while breaking down the formation. The cement composition of this invention appears to bridge these openings permitting the build up of pressure on the cement job to get the desired result.

The surprising effectiveness of the cement composition of this invention as a remedy for lost circulation of drilling fluids, cement slurries and such special cement jobs as the aforementioned "squeeze" cementing appears to result from a progressive bridging action in which the particles of expanded volcanic rock build up across the openings through which circulation is lost and are surrounded and agglomerated by the setting action of the cement. Bridging appears to occur effectively when graded sizes of expanded volcanic rock having a particle size range up to one-half of the smallest average dimension of the opening to be closed are used.

This progressive bridging action is illustrated by the following examples.

EXAMPLE V

*Hockley Field, Harris County, Texas.*—Well with 10¾" casing set at 1660 feet. Circulation of drilling fluid was lost between 4865 feet and 4899 feet. Attempts to cement with 100 sacks of cement with 3% bentonite and 1% cellophane flakes failed. The well was then cemented with perlite cement containing 6% bentonite according to this invention by pumping a slurry of 25 sacks of cement with 13 sacks of size D perlite (80% below .065 inch in diameter) and 6% bentonite through the drill pipe, followed by a slurry of 25 sacks of cement with 12 sacks of size C perlite (89% below .065 inch in diameter) and 6% bentonite and finally followed by a slurry of 25 sacks of cement with 13 sacks of size B perlite (85% below .023 inch in diameter) with 6% bentonite. After the cement had set for 8 hours, the circulation of drilling mud was restored.

EXAMPLE VI

*Jacksonville, Texas, Field.*—The total depth of the well was 8730 feet with casing at 8723 and circulation was lost in Rodesa formation at 8626 feet. The lost circulation was stopped in two stages of cementing. The first stage was accomplished by pumping into the well a slurry of 20 sacks of cement and 15 sacks of perlite "D," followed by 40 sacks of cement and 18 sacks of perlite "C," and followed by 40 sacks of cement and 17 sacks of perlite "B." These mixtures in the order named were pumped down the drill pipe with a squeeze tool set near the bottom of the casing. The second stage was accomplished by pumping a slurry of 20 sacks of cement with 9 sacks of perlite "D," followed by 20 sacks of cement and 8 sacks of perlite "C" and then followed by 10 sacks of cement and 8 sacks of perlite "B." This was pumped with the squeeze tool on the drill pipe set above the perforated zone at 8608–8618 feet. In each case the slurry with the largest size of perlite was pumped into the well first and the smallest last. Tests showed that loss of cement and drilling fluid was stopped and the casing was satisfactory.

While I have attempted to explain the effectiveness of my cement composition and method of cementing oil wells on the basis of theories which seem consistent with observed facts, I do not bind myself to such theories. Accordingly it will be understood that while I have illustrated and described a present preferred embodiment of my invention, it may be otherwise embodied or practiced within the scope of the following claims.

I claim:

1. A composition for use in cementing oil and gas wells or the like comprising about equal volumes of cement and expanded perlite and about 5% of bentonite by weight of the weight of the cement.

2. A slurry for use in cementing oil and gas wells or the like comprising a mixture of equal volumes of cement and expanded perlite and about 5% by weight of bentonite on the weight of the cement in amount of water equal to about 40–90% by weight of the cement.

3. The method of cementing oil and gas wells or the like comprising admixing cement and volcanic rock which has been expanded into cellular form by heating in a ratio by volume of between about 1 part cement to from about 0.1 part to 8 parts expanded volcanic rock in water and pumping the resulting admixture into the well hole.

4. The method of cementing oil and gas wells or the like comprising admixing cement and volcanic rock which has been expanded into cellular form by heating, in a ratio by volume of between about 1 part cement to from about 0.1 part to 8 parts expanded volcanic rock and up to about 10% bentonite by weight of the weight of the cement in water and pumping the resulting admixture into the well hole.

5. The method of cementing oil and gas wells or the like comprising admixing cement and volcanic rock which has been expanded into cellular form by heating in a ratio by volume of between about 1 part cement to from about 0.1 part to 2 parts expanded volcanic rock and up to about 10% bentonite by weight of the weight of the cement.

6. The method of cementing oil and gas wells or the like comprising admixing cement and perlite in a ratio by volume of between about 1 part cement to from about 0.5 part to 2 parts expanded perlite in water and pumping the resulting admixture into the well hole.

7. The method of cementing oil and gas wells or the like comprising admixing cement and perlite in a ratio by volume of between about 1 part cement to from about 0.1 part to 8 parts expanded perlite and up to about 10% bentonite by weight of the weight of the cement and pumping the resulting admixture into the well hole.

8. The method of cementing oil and gas wells which comprises admixing cement and volcanic rock which has been expanded into cellular form by heating in a ratio by volume of about 1 part cement to from about 0.1 part to 8 parts expanded volcanic rock with up to about 10% of bentonite by weight of the cement in sufficient water to form a slurry having a viscosity of less than 40 poises and pumping the resulting mixture into the well hole.

9. A method of cementing oil and gas wells which comprises admixing cement and volcanic rock which has been expanded into cellular form by heating in a ratio by volume of about 1 part cement to from about 0.1 part to 8 parts expanded volcanic rock with up to about 10% of bentonite by weight of the cement in an amount of water equal to about 40% to 90% by weight of the weight of the cement and pumping the resulting admixture into the well hole.

10. A method of cementing oil and gas wells which comprises admixing cement and expanded perlite in a ratio by volume of about 1 part cement to from about 0.5 part to 2 parts expanded perlite with up to about 10% bentonite by weight of the cement in water and pumping the resulting admixture into the well hole.

11. A method of cementing oil and gas wells which comprises admixing cement and expanded perlite of graded sizes in a ratio by volume of about 1 to 1 with about 5% of bentonite by weight on the weight of the cement in an amount of water equal to about 40% to 90% by weight of the weight of the cement and pumping the resulting admixture into the well hole.

12. The method of preventing lost circulation of drilling fluid through an opening in well hole walls which comprises admixing cement and volcanic rock which has been expanded into cellular form by heating of graded sizes having the range of particle size up to about one-half of the average of the smaller dimensions of the opening in a ratio by volume of about 1 part cement to from about 0.1 part to 8 parts expanded volcanic rock with up to about 10% of bentonite by weight on the weight of the cement in sufficient water to form a pumpable slurry, pumping the resulting admixture into the well hole and into contact with the openings in the well hole walls and permitting the admixture to solidify in said openings.

13. The method of cementing oil and gas wells to prevent lost circulation of a cement slurry which comprises adding to the slurry an amount of volcanic rock which has been expanded into cellular form by heating equal to a ratio of between about 1 part cement to from about 0.1 part to 8 parts expanded volcanic rock by volume on the volume of the cement and pumping the resulting slurry into the well hole.

14. The method of cementing oil and gas wells or the like to prevent lost circulation through openings in well hole walls, comprising admixing cement, volcanic rock particles which have been expanded into cellular form by heating and sufficient water to form a pumpable mixture, said volcanic rock particles being of sufficient size to bridge the openings through which circulation is lost, the mixture of cement and expanded volcanic rock being in a ratio by volume of between about 1 part cement to from about 0.1 part to 8 parts expanded volcanic rock, and pumping the resulting admixture into the well hole.

15. The method of cementing oil and gas wells or the like to prevent lost circulation through openings in well hole walls, comprising admixing cement, bentonite, volcanic rock particles which have been expanded by heating and sufficient water to form a pumpable mixture, said expanded volcanic rock particles being of sufficient size to bridge the openings through which circulation is lost, the cement and expanded volcanic rock being in a ratio by volume of between about 1 part cement to from about 0.5 part to 2 parts expanded volcanic rock and the bentonite being up to about 10% by weight of the weight of the cement, and pumping the resulting admixture into the well hole.

16. The method of cementing oil and gas wells or the like to prevent lost circulation through openings in well hole walls, comprising admixing cement, expanded perlite which have been expanded into cellular form by heating and sufficient water to form a pumpable mixture, said particles being of sufficient size to bridge the openings through which circulation is lost, the mixture of cement and expanded perlite being in a ratio by volume of between about 1 part cement to from about 0.1 to 8 parts expanded perlite, and pumping the resulting admixture into the well hole.

17. The method of cementing oil and gas wells or the like to prevent lost circulation through openings in well hole walls, comprising admixing cement, bentonite, expanded perlite particles which have been expanded by heating and sufficient water to form a pumpable mixture, said expanded perlite particles being of sufficient size to bridge the openings through which circulation is lost, the cement and expanded perlite being in a ratio by volume of between about 1 part cement to from about 0.5 part to 2 parts expanded perlite and the bentonite being up to about 10% by weight of the weight of the cement, and pumping the resulting admixture into the well hole.

18. The method of cementing oil and gas wells or the like to prevent lost circulation of drilling fluid in well holes which comprises incorporating into a cement-water mixture in successive steps expanded particles of volcanic rock of successively smaller particle sizes which has been expanded by heating, pumping the mixture resulting from each successive addition of volcanic rock into the well hole to bridge the openings through which circulation is lost.

19. The method of cementing oil and gas wells or the like to prevent lost circulation of drilling fluid through openings in the walls of a well hole which comprises successively pumping portions of a cement-water slurry into the well hole, into each portion of which, expanded particles of volcanic rock which have been expanded by heating have been incorporated, the particles of expanded volcanic rock in each successive portion being successively smaller in size thereby bridging the openings with successively smaller particles.

20. The method of cementing oil and gas wells or the like to prevent lost circulation of drilling fluid through openings in the walls of a well hole which comprises successively pumping portions of a cement-water slurry into the well hole, into each portion of which, expanded particles of perlite which have been expanded by heating have been incorporated, the particles of expanded perlite in each successive portion being successively smaller in size thereby bridging the openings with successively smaller particles.

References Cited in the file of this patent

UNITED STATES PATENTS

| Number | Name | Date |
| --- | --- | --- |
| 1,770,767 | Collings et al. | July 15, 1930 |
| 1,807,082 | Boynton | May 26, 1931 |
| 1,885,731 | Kraus | Nov. 1, 1932 |
| 2,041,086 | O'Brien | May 19, 1936 |
| 2,079,518 | McQuiston | May 4, 1937 |
| 2,206,677 | Shepler | July 2, 1940 |
| 2,288,557 | Vollmer | June 30, 1942 |
| 2,326,577 | Teague et al. | Aug. 10, 1943 |
| 2,337,295 | Kennedy | Dec. 21, 1943 |
| 2,353,372 | Stone | July 11, 1944 |
| 2,561,075 | Sidwell | July 7, 1951 |

OTHER REFERENCES

Bureau of Mines Information Circular 7364, "Perlite, Source of Synthetic Pumice," August 1946, pages 1–4 and 7.

Oil and Gas Journal, July 28, 1949, pages 280, 283, 284.